Oct. 2, 1923.

D. C. ROSE

EMERGENCY WHEEL LOCK

Filed Aug. 7, 1922     2 Sheets-Sheet 1

1,469,269

Inventor
David C. Rose
By Lemmel & Lemmel
Attorneys

Oct. 2, 1923.

D. C. ROSE 1,469,269

EMERGENCY WHEEL LOCK

Filed Aug. 7, 1922    2 Sheets-Sheet 2

Inventor
David C. Rose
By Semmes & Semmes
Attorneys

Patented Oct. 2, 1923.

1,469,269

UNITED STATES PATENT OFFICE.

DAVID C. ROSE, OF FORT MONTGOMERY, NEW YORK.

EMERGENCY WHEEL LOCK.

Application filed August 7, 1922. Serial No. 580,102.

*To all whom it may concern:*

Be it known that I, DAVID C. ROSE, a citizen of the United States, residing at Fort Montgomery, in the county of Orange and State of New York, have invented certain new and useful Improvements in Emergency Wheel Locks, of which the following is a specification.

This invention relates to certain new and useful improvements in vehicle brakes.

One of the difficulties found in motoring is the lack of an absolutely safe and positive lock for the rear wheels when the same are upon a hill and the engine is dead. The usual practice is for the driver to get out of the car and secure a stone and piece of wood to place them under the tires and chock the wheels. When one is traveling in mountainous territory this lack of a positive control for the rear wheels of the car has proven to be quite dangerous.

One of the objects of my invention, therefore, is to provide in addition to the usual brake with which each car is equipped, a positive lock for the rear wheels so that said wheels may be effectively prevented from turning rearwardly when upon a steep incline, and all danger of the car backing down hill avoided.

Another object of my invention is to provide a brake of the character described in the preceding paragraph which can be operated from the driver's seat.

A further object of my invention is to provided a brake of simple construction as a whole, and in respect of each of its component parts so that its manufacture is economically facilitated both as regards production of the several parts and of their assembly.

With these and other objects in view which may be incident to my improvements, the invention consists in the parts and combinations to be hereinafter set forth and claimed, with the understanding that the several necessary elements comprising my invention, may be varied in construction, proportions and arrangement, without departing from the spirit and scope of the appended claims.

In order to make my invention more clearly understood, I have shown in the accompanying drawings means for carrying the same into practical effect without limiting the improvements in their useful applications to the particular constructions, which for the purpose of explanation, have been made the subject of illustration.

Figure 1:
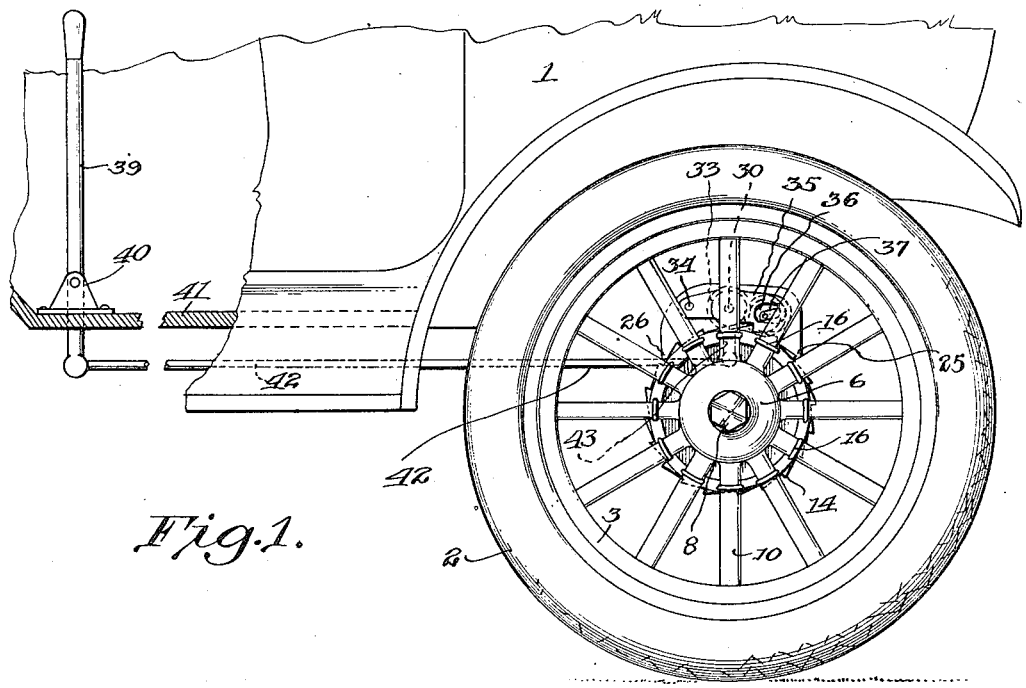
Figure 1 is a view of my device in locked position as it appears attached to one of the rear wheels of a car.
Figure 2:
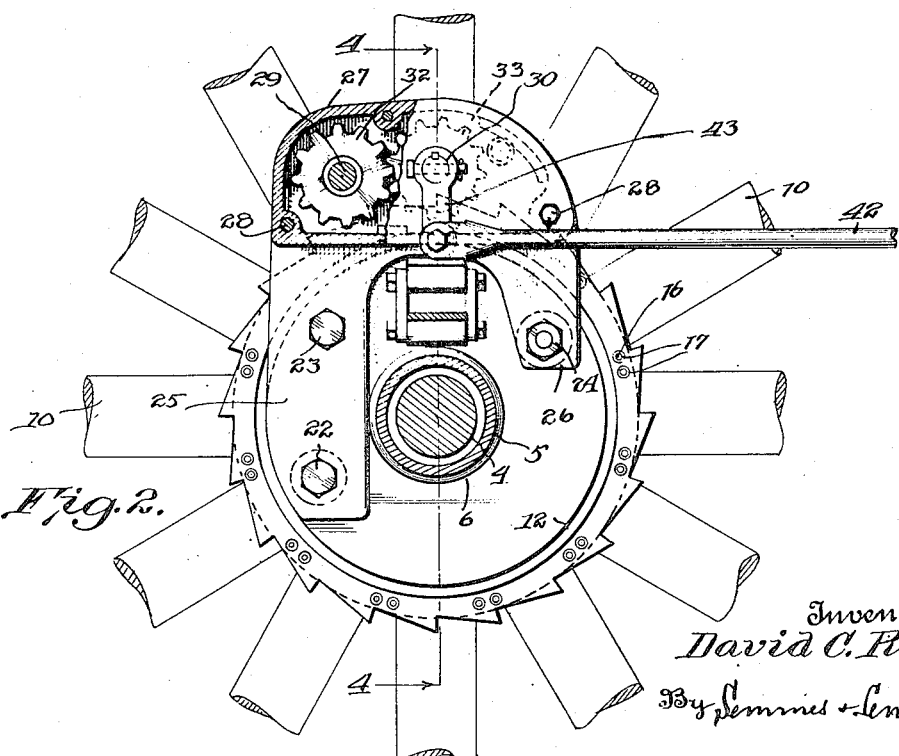
Fig. 2 is an enlarged detail view of my device as it appears upon the inner face of the wheel, with a portion of the casing broken away so as to show the gears.

The numeral 1, represents the body of a car, and the numeral 2, the pneumatic tire mounted upon the rim 3 of one of the rear wheels. The numeral 4 represents the rear axle shaft extending through the axle housing 5, to the end of which housing is welded in the hub portion 6 of the flanged brake carrying plate 7. The numeral 8 represents the nut upon the end of the hub cap 9 upon the outer face of the wheel, and the numeral 10 represents one of the spokes thereof.

The numeral 11 represents the usual brake pan around whose outer exterior periphery 12 is fitted an annular metallic band 13, of practically the same width as the periphery 11 of the brake pan upon which it is superposed. This band on the side non-adjacent the wheel is provided with a series of serrated edges or teeth 14, and at points around its circumference are apertures through each adjacent pair of which is inserted a U-shaped bolt 16 adapted to encircle one of the spokes 10 and to clamp the wheel and annular band or rack 13 tightly together by means of the nuts 17 screwed on the free ends of the bolt. While one of these U-shaped bolts 16 is shown in the drawing as clamped around each spoke, making 12 in all, usually four are sufficient.

Figure 5:
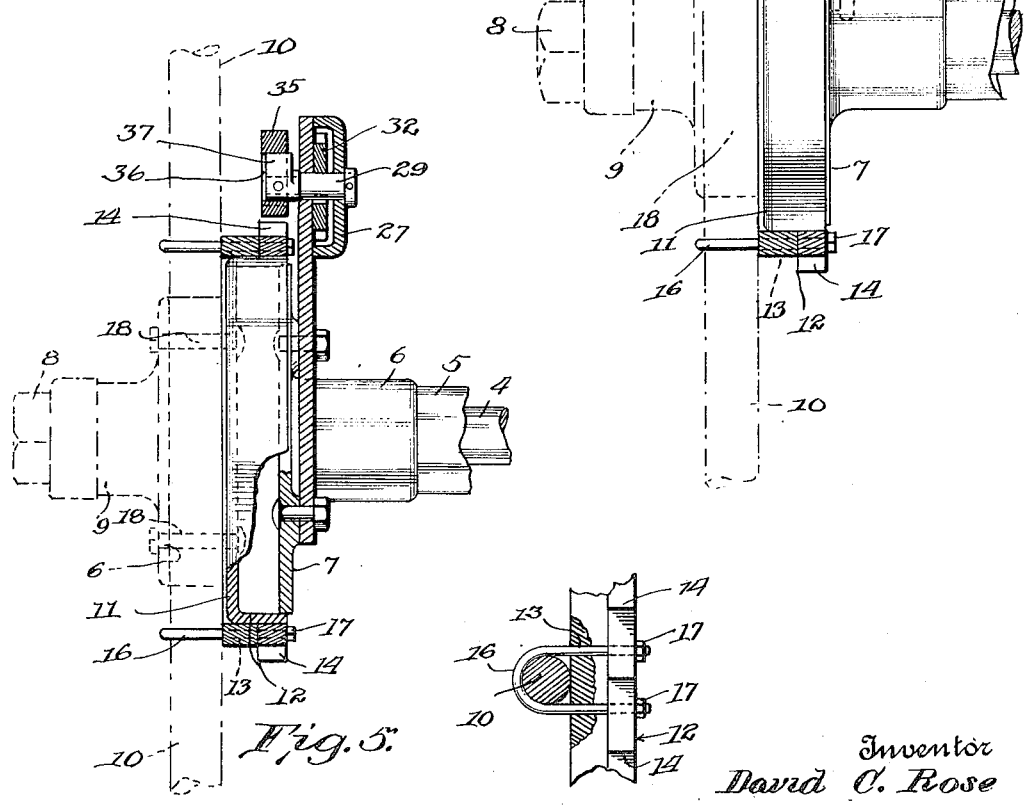
Fig. 5 is a cross-sectional view on the line 5—5 of Fig. 3.
Figure 6:
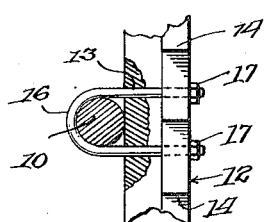
Fig. 6 is a detail view showing the manner of fastening my device to the spokes of the wheel.

As seen more particularly in Fig. 5, the brake pan itself is secured to the hub of the wheel by bolts 18 passing therethrough and within this pan is adapted to fit the plate 7 and the brake (not shown) which need not be further described as it forms no part of my invention.

Rigidly secured to the outer face of the brake carrying plate 7 by means of bolts 22, 23 and 24, is what I term a fulcrum plate 25 whose contour somewhat resembles that of an inverted U having one leg 26 shorter than the other, and upon the upper part of said fulcrum plate is located a housing or casing 27 properly secured thereto as by means of bolts or rivets 28. The object in giving the fulcrum plate the inverted U-shape formation is to enable it to fit around the usual auto spring lug located upon the brake carrying plate of a Ford car, and in the link depending from which rests one end of a leaf spring supporting the rear portion of the body of the car.

Within the casing I mount rigidly upon the shafts 29 and 30 respectively, two intermeshing gear wheels 32 and 33, the shaft 29 projecting beyond the casing on the opposite side and having its head terminating in a cam pin 37.

Figure 3:
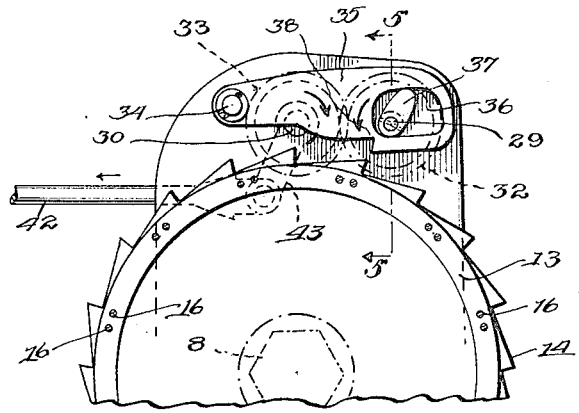
Fig. 3 is a side view of that part of my device seen in Fig. 1, showing the pawl and ratchet ring in unlocked position.
Figure 4:
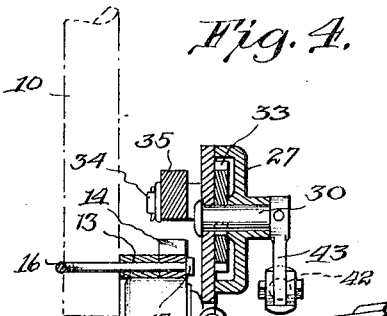
Fig. 4 is a cross-sectional view on the line 4—4 of Fig. 2.

Upon said opposite side of the casing is also loosely and pivotally secured thereto by a bolt 34 a pawl 35, provided at its unattached end with an opening 36 forming a cam groove within which the cam pin 37 is adapted to travel and operate the pawl as the gears turn upon their axis. As seen in Fig. 3, this pawl with its detent 38 is adapted to be lowered by the cam so as to engage with the teeth 14 upon the annular ratchet or rack band 13, and lock fast the wheel, from moving rearwardly.

The pawl 35 is operated by means of lever 39, located within easy reach of the driver, the same being fulcrumed in a bearing 40 upon the floor 41 of the car, and to the lower end of the lever is pivotally fastened one end of a connecting bar 42, the further end thereof encircling the crank arm 43 of the shaft 30 upon which is mounted the gear wheel 33.

It will be seen by the drawings that when the lever 39 is pulled backward, the gears turn in the direction of the arrows shown in Fig. 3 and the cam 37 will rise, lifting the pawl 35, thus disengaging it from the ratchet teeth 14 and permitting the rear wheels to rotate in either direction. When, however, the driver pushes the lever 39 forward, the gears 32 and 33 will rotate in the direction opposite to that shown by the arrows in Fig. 3, causing the cam 37 to swing downwardly and to the right, as will be readily understood by reference to Fig. 3. This lowers the pawl so that its detent will engage one of the teeth on the rack band and thereby prevent the wheel from rotating to the rear.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. In a wheel locking device for vehicles, the combination with the hub of a wheel, a brake carrying plate cooperating therewith, a cam, an annular rack, means to secure the rack to the wheel and intermeshing gears to operate the pawl, of a lever in the body of the car and mechanism between the lever and the gears whereby upon the movement of the lever the cam throws the pawl into and out of operative engagement with the annular rack to positively and effectively lock the wheel.

2. In a wheel locking device for vehicles, the combination with the hub of the wheel, a brake pan, an annular rack surrounding the exterior periphery of the brake pan, a brake carrying plate, a fulcrum plate secured to the brake carrying plate, a casing on the fulcrum plate, intermeshing gears therein, a pawl mounted on the front face of the casing having an apertured cam track, and a cam pin projecting from one of the gears adapted to travel in said track to operate the pawl, of a lever, mechanism between the lever and the gears whereby upon the movement of the lever the gears actuate the cam to throw the pawl into and out of operative engagement with the annular rack.

3. In a wheel locking device for vehicles, the combination with the hub of a wheel, a brake pan thereon, an annular rack surrounding the brake pan, a brake carrying plate, a fulcrum plate secured to the brake carrying plate, intermeshing gears therein, a pawl with an apertured track operated by said gears and a cam pin projecting from one of the gears adapted to travel in said track to operate the pawl, of a lever, mechanism between the lever and the gears whereby upon the movement of the lever the gears actuate the cam and the pawl is thrown into and out of operative engagement with the annular rack, and the wheel positively and effectively locked.

4. In a wheel locking device for vehicles, the combination with the hub of the wheel, a brake pan, an annular rack surrounding the exterior periphery of the brake pan, a brake carrying plate, a fulcrum plate of substantially U-shape formation secured to the brake carrying plate, a casing on the fulcrum plate, intermeshing gears therein, a pawl mounted on the front face of the casing having an apertured cam track, and a cam pin projecting from one of the gears adapted to travel in said track to operate the pawl, of a lever, mechanism between the lever and the gears whereby upon the movement of the lever the gears actuate the cam and the pawl is thrown into and out of operative engagement with the annular rack, and the wheel positively and effectively locked.

In testimony whereof I affix my signature.

DAVID C. ROSE.